United States Patent
Adrianov et al.

(10) Patent No.: US 7,119,047 B1
(45) Date of Patent: Oct. 10, 2006

(54) MODIFIED ACTIVATED CARBON FOR CAPACITOR ELECTRODES AND METHOD OF FABRICATION THEREOF

(75) Inventors: Michail N. Adrianov, Moscow Region (RU); Vera V. Litvinskaya, Moscow Region (RU); Vitaly P. Popov, Moscow Region (RU); Natalya M. Zaruchejskaya, Moscow Region (RU); Valentin V. Chebykin, Moscow Region (RU); Pavel A. Shmatko, Moscow Region (RU); Valery A. Carev, Moscow Region (RU)

(73) Assignee: C and T Company, Inc., Thornhill (CA)

( * ) Notice: Subject to any disclaimer, the term of this patent is extended or adjusted under 35 U.S.C. 154(b) by 85 days.

(21) Appl. No.: 09/793,379

(22) Filed: Feb. 26, 2001

(51) Int. Cl.
  *C01B 31/08* (2006.01)
(52) U.S. Cl. .................. 502/416; 423/460; 502/426
(58) Field of Classification Search ............ 423/445 R, 423/460, 461; 502/180, 416, 426, 427
See application file for complete search history.

(56) References Cited

U.S. PATENT DOCUMENTS

| 3,619,387 | A |   | 11/1971 | Mindt et al. |
| 3,631,302 | A |   | 12/1971 | Robinson |
| 3,787,961 | A |   | 1/1974  | Tomiwa |
| 3,944,513 | A | * | 3/1976  | Greenwald et al. ......... 528/482 |
| 4,184,192 | A |   | 1/1980  | Yoshida et al. |
| 4,299,805 | A | * | 11/1981 | Wells ..................... 423/321.1 |
| 4,624,937 | A | * | 11/1986 | Chou ......................... 502/180 |
| 4,888,666 | A |   | 12/1989 | Naitoh et al. |
| 4,889,536 | A |   | 12/1989 | Naitoh et al. |
| 4,937,223 | A | * | 6/1990  | Yamaguchi ................. 502/427 |
| 4,946,663 | A | * | 8/1990  | Audley et al. ........... 423/447.1 |
| 4,952,465 | A |   | 8/1990  | Harris et al. |
| 5,120,423 | A |   | 6/1992  | Kurita et al. |
| 5,510,211 | A |   | 4/1996  | Sundberg et al. |
| 5,766,789 | A |   | 6/1998  | James et al. |
| 6,115,235 | A |   | 9/2000  | Naito |
| 6,195,252 | B1 |  | 2/2001  | Belyakov et al. |
| 6,251,822 | B1 | * | 6/2001 | Peng et al. ................. 502/423 |
| 2001/0008617 | A1 | * | 7/2001 | Robles ........................ 423/22 |

FOREIGN PATENT DOCUMENTS

| JP | 51089888   | * | 8/1976  |
| JP | 51089888 A | * | 8/1976  |
| JP | 56160312 A | * | 12/1981 |
| JP | 04200743   | * | 7/1992  |

* cited by examiner

*Primary Examiner*—Stuart Hendrickson
(74) *Attorney, Agent, or Firm*—Kilpatrick Stockton, LLP; Camilla C. Williams; Bruce D. Gray

(57) ABSTRACT

A novel electrode and method of making the same. The electrode includes activated carbon that has been modified by treatment with an alkali solution and an acid, such as nitric acid, and then washed and dried. The carbon may then be annealed. The method of modifying the activated carbon helps produce an electrode with considerably higher electric capacity and stable electric characteristics. Additionally, the electrodes may be produced more quickly and inexpensively and, therefore, permits their production of electrodes that are used for superconductors.

6 Claims, No Drawings

MODIFIED ACTIVATED CARBON FOR CAPACITOR ELECTRODES AND METHOD OF FABRICATION THEREOF

FIELD OF THE INVENTION

This invention relates generally to capacitors and other energy storage devices, and more particularly to electrodes for use in such devices, and methods of making such electrodes.

DESCRIPTION OF THE PRIOR ART

Numerous ways to produce activated carbon materials for use in electric storage devices are known. Russian Patent 2,038,295 teaches the preparation of a granulated activated carbon for recuperation from hydrolysis processes residua modified using 0.75 to 1.5% (w/w) orthophosphoric acid. The raw semicoke material, having total pore volume in the 0.20–0.40 cm$^3$/g range, ash content of 1.5 to 4.0%, and phosphorous content from 0.6 to 1.2%, is ground, mixed with binder, granulated, dried, carbonized and steam-activated to achieve total pore volume of 0.60–0.75 cm$^3$/g. The electric capacity of the activated carbon produced by this method is insufficient.

Russian Patent 2,031,837 describes a method for preparation of activated carbon comprising: mixing of cellolignin or lignin with 0.3–1.0% (w/w) orthophosphoric acid, briquetting, drying, carbonization at heating rate of 20–50° C./h up to 500–700° C., grinding and activation to total pore volume of 0.8–1.2 cm$^3$/g. However, the activated carbon produced according to this method has unsatisfactory electric properties.

Another method for preparation of activated carbon to be used as capacitor electrodes is described comprising treatment of the carbon with cyanides and subsequently with 1M phosphoric acid (see Carbon, Vol. 28, No. 2/3, pp. 301–309, 1990). A drawback of this method is that the modified active carbon contains complex insoluble iron compounds, which cause decrease in the micropore volume and thus, in the electric capacity of the carbon. Moreover, the use of highly toxic cyanides as modifiers requires additional safety means.

Closest to the present invention from technical point of view is the method developed by the I. A. Kuzin's group, comprising treatment of the carbon with concentrated nitric acid, washing and drying (see I. A. Tarkovskaya, "Oxidized Carbon", Kiev, 1981 pp. 123–132 and 164, in Russian). This method is considered as a prototype of the invention hereafter. Some drawbacks of the prototype can be pointed out: its unstable electric properties and loss of electric capacity due to both changes in the pore structure and formation of considerable amount of soluble organic compounds in carbon bulk. Furthermore, high concentrations of nitric acid cause destruction and loss of the valuable carbonaceous material.

SUMMARY OF THE INVENTION

The goal of the present invention is to obtain activated carbon having high electric capacity and stable electric characteristics.

The goal is achieved by the method proposed, comprising treatment of the activated carbon with 1.0–10.0% alkali solution, followed by treatment with 0.2–10.0% nitric acid, washing and drying. After drying, the carbon can be annealed at 135–950° C. in inert or slightly oxidative medium or at 135–350° C. in air, steam or exhaust gases atmosphere. In addition, washing the carbon following the acid treatment can be done using ammonia solution up to pH 4–10, and the annealing after drying is applied in inert or exhaust gases atmosphere up to 135–950° C. It will be understood that the exhaust gases to be utilized are those resulting from the pyrolysis of carbon.

DETAILED DESCRIPTION OF SPECIFIC EMBODIMENTS

The difference of the present invention from the prototype is in the alkali solution (1.0–10.0%) treatment prior to the nitric acid treatment, while the preferred concentration of the nitric acid is 0.2–10.0%. Moreover, the carbon after drying can be annealed up to either 135–950° C. in inert or mildly oxidative atmosphere or 135–350° C. in air, steam or exhaust gases atmosphere. Acid treatment can be followed by washing in ammonia solution up to pH 4–10 and subsequent annealing up to 135–950° C. in inert or exhaust gases atmosphere.

To the best of the inventors' knowledge, no such method has been described so far in the literature for fabrication of electrodes for capacitors.

Employing the abovementioned features in accordance with the present invention provides considerable increase of the electric capacity and stable characteristics of the resulting carbon and, therefore, permits fabrication of electrodes for supercapacitors based on said carbon having maximum electric capacity and stable performance.

The present invention provides formation of the carbon surface, which renders it resistant to oxidation-reduction processes at the electrode-electrolyte interface when the electrode is employed in bipolar configuration for typical double-layer applications.

In another embodiment, when the electrode is employed in monopolar configuration, its electric capacity increases due to formation of ionic adduct of the electrolyte and the carbon matrix, and to formation of surface functional groups that can be protonated and deprotonated.

Numerous experiments led to conclusion that the determining factors to achieve the goal of the invention are the concentrations of both alkali and acid as well as proper choice of the heating conditions, namely atmosphere and temperature range.

It has been experimentally ascertained that the carbon precursor is to be treated with alkali solution with concentration ranging from 1.0 to 10.0%. The alkali concentration is determined by the need to dissolve phosphorus, aluminum, silicon, and iron while keeping the pH in the range that excludes possibility of hydrolysis of these elements, which reduce the electric capacity. Alkali concentration higher than 10% leads to unnecessary expenses, while dissolution using alkali with concentration lower than 1.0% is not complete.

Nitric acid is applied with preferred concentration of 0.2 to 10.0%. The process of fabrication of activated carbon slows when concentrations below this range are used, higher amount of liquid and higher energy consumption are required, and the total process is not profitable. At concentration higher than 10.0%, the oxidation process is unstable for its electrochemical potential becomes higher than the permissible, thus the carbon is partially destroyed and capacity lost.

The annealing at 135–950° C. in inert or slightly oxidative atmosphere aims to improve the electric properties of the carbon. Annealing at temperature lower than 135° C. only dries the activated carbon and does not provide sufficient capacity, while temperatures above 950° C. completely destroy the active surface groups of the carbon, which leads to partial loss of capacity and substantial rise of energy consumption during the formation process.

If the annealing under air, steam or exhaust gases off gases is performed at temperature lower than 135° C., no changes of the surface groups take place and, therefore, it is impossible to obtain carbon with desirable properties. If the annealing is performed at temperatures higher than 350° C., oxidative destruction causes loss of the acquired capacity.

Nitric acid treatment can be followed by neutralization with ammonia solution up to pH 4–10. Below pH 4, the neutralization does not achieve the desired effect since nitric acid is evolved at drying. Above pH 10, ammonia is evolved causing unnecessary high consumption and environmental pollution. In this case, the annealing is performed at 135–950° C. Ammonia surface compounds do not decompose below 135° C., therefore the resulting carbon cannot provide the desired capacity. Annealing at temperatures higher than 950° C. leads to complete destruction of the active groups on the carbon surface and thus to lower electric capacity.

According to the invention, the activated carbon is treated as follows: modified with 1.0–10.0% alkali solution, washed, placed into a column, leached with 1.0–10.0% nitric acid, washed from the free nitric acid and dried. After drying, the carbon can be annealed at 135–950° C. in inert or mildly oxidative atmosphere or at 200–350° C. under air, steam or exhaust. The acid treatment can be followed by neutralization with ammonia solution to pH 4–10 and subsequently by annealing at 135–950° C. under inert or exhaust gases.

EXAMPLES

Example 1

1 kg of activated carbon is treated with 315% NaOH and washed with water. Then it is placed in a stationary layer column and treated with 2% solution of $HNO_3$. The free nitric acid is washed off and the carbon dried, cooled and unloaded. During the formation process, an electrode employing the resulting carbon exhibits 5–7 times lower irreversible losses than an electrode employing a carbon made from the same precursor, which have been only de-ashed with HCl. In the former case, the irreversible capacity losses begin at 1.1 V, while in the latter at 0.8 V. On cycling between +0.9 and −0.1 V, the former electrode delivers integral capacity of 520–550 F/g and the latter 180–200 F/g. When cathodically polarized, the carbon obtained according to the invention exhibits two capacitance maxima in the ranges 0.7–0.5 V and 0.2–0.1 V.

Example 2

Carbon obtained in Example 1 is annealed under $CO_2$ flow at 400° C.

Example 3

Carbon obtained in Example 1 is annealed in steam atmosphere at 275° C.

Example 4

Carbon obtained in Example 1 is annealed in argon atmosphere at 600° C.

Example 5

Carbon obtained in Example 1 is annealed in air atmosphere at 250° C.

Example 6

Carbon obtained in Example 1 is annealed in exhaust gases environment at 320° C.

On cycling between +0.9 and −0.1 V, electrodes made using carbons of Examples 2–6 exhibited integral capacity of 500–540 F/g. At cathodic polarization the carbon capacity displays a maximum in the +0.4÷−0.1 V range.

Example 7

1 kg of active carbon is treated with 315% NaOH and washed with water. Then it is placed in a stationary layer column and treated with 2% solution of $HNO_3$. The carbon is subsequently neutralized with 1% solution of ammonia up to pH 9, dried at 105° C. and annealed at 380° C. in inert or exhaust gases atmosphere. On cycling in the same potential range, 500–550 F/g are achieved and the cathodic polarization maximum is situated between +0.5 and 0.0 V.

The following table compares cycling data for some carbons represented in the Russian Catalogue that have been treated with 1M $H_2SO_4$ and according to the present invention.

TABLE

Cycling results of some treated carbons.

| Carbon code | Pristine carbon C, F/g | SD at 0.8 V, mV/h | SD at 0.0 V, mV/h | Carbon of example 1 C, F/g | SD at 0.8 V, mV/h | SD at 0.0 V, mV/h | Carbon of example 2 C, F/g | SD at 0.8 V, mV/h | SD at 0.0 V, mV/h | Carbon of example 3 C, F/g | SD at 0.8 V, mV/h | SD at 0.0 V, mV/h |
|---|---|---|---|---|---|---|---|---|---|---|---|---|
| AG-3 | 35–45 | 50–70 | 30–50 | 120–150 | 1.2 | 5.0–6.0 | 122 | 5.0 | 1.5 | 127 | 4.0 | 1.0 |
| MeKC | 100–150 | 60–80 | 30–50 | 250–300 | 0.6 | 3.2 | 250–320 | 1.2 | 0.6 | 270 | 1.2 | 0.3 |
| ACB | 250–300 | 30–40 | 20–30 | 450–620 | 0.2 | 1.3 | 470–650 | 1.0 | 0.1 | 450–650 | 1.0 | 0.25 |
| CKT | 250–300 | 70–100 | 30–60 | 500–750 | 1.0–1.5 | 5.0–6.0 | 500–760 | 5.0 | 2.5 | 500–740 | 4.0 | 2.0 |

C designates capacity, SD designates self-discharge

The table shows that the electric capacity of the carbons produced according to the present invention is considerably higher than that of the initial ones, the self-discharge is considerably lower, which testifies on their high electric stability.

The carbon fabricated using combination of treatment modes 1, 2, and 3 is a multipurpose material and can be used in preparation of composite electrodes for acidic and basic mono- and bipolar capacitors as well as for capacitors employing neutral and aprotic electrolyte.

The main advantage of the carbon fabricated according to the invention is realized in hybrid capacitor storage systems, for instance, carbon-lead.

As stated above, any of the procedures according to the invention influences to greater or smaller degree the desired properties of the final product, namely high electric capacity and stable electric performance. The aggregate of these procedures is sufficient to completely characterize the essence of the present invention.

What is claimed is:

1. A method of fabrication of modified activated carbon, comprising
    treatment of pristine carbon with nitric acid, subsequent washing, drying, and annealing, wherein prior to acid treatment said carbon is treated with alkali solution having concentration of 1.0 to 10.0%, while the nitric acid concentration ranges from 0.2 to 10.0%, wherein after drying said carbon is annealed at 135–950° C. and wherein the carbon is annealed in an atmosphere comprising $CO_2$.

2. A method according to claim 1, wherein said annealing step is carried out at 400° C.

3. A method of fabrication of modified activated carbon, comprising treatment of pristine carbon with nitric acid, subsequent washing, drying, and annealing, wherein prior to acid treatment said carbon is treated with alkali solution having concentration of 1.0 to 10.0%, while the nitric acid concentration ranges from 0.2 to 10.0%, and wherein washing of said carbon is performed using ammonia solution to pH 4–10.

4. A method according to claim 3, wherein after drying said carbon is annealed at 135–950° C.

5. A method according to claim 4, wherein the carbon is annealed in an atmosphere comprising argon.

6. A method according to claim 5, wherein said annealing step is carried out at 600° C.

* * * * *